United States Patent [19]

Hino et al.

[11] 4,371,665

[45] Feb. 1, 1983

[54] MODIFIED EPOXY RESIN COMPOSITION

[75] Inventors: Minoru Hino, Takatsuki; Takao Oshima, Otsu, both of Japan

[73] Assignees: Sumitomo Chemical Company, Limited, Osaka; Tohto Kasei Co., Ltd., Tokyo, both of Japan

[21] Appl. No.: 333,454

[22] Filed: Dec. 22, 1981

[30] Foreign Application Priority Data

Dec. 29, 1980 [JP] Japan .................. 55-185573

[51] Int. Cl.³ .................................................. C08L 63/00
[52] U.S. Cl. ...................................... 525/109; 525/113; 525/529; 525/533; 528/110; 528/113
[58] Field of Search ............... 525/109, 113, 529, 533

[56] References Cited

U.S. PATENT DOCUMENTS

| | | | |
|---|---|---|---|
| 4,116,900 | 9/1978 | Belanger | 525/533 |
| 4,298,656 | 11/1981 | Mendelsohn | 525/113 |
| 4,335,031 | 6/1982 | Hazah | 525/109 |

*Primary Examiner*—Paul Lieberman
*Attorney, Agent, or Firm*—Birch, Stewart, Kolasch and Birch

[57] ABSTRACT

Modified epoxy resin composition having excellent flexibility and excellent compatibility with conventional epoxy resins as well as the original properties of the epoxy resin before modified such as mechanical strength, adhesion, heat resistance and chemical resistance, which is obtained by treating an epoxy resin with at least one modified adduct [D] of a conjugated diene polymer or copolymer which has an imido bond and/or amido bond and a semi-ester structure and has an acid value owing to a free carboxyl group of 5 to 100, said modified adduct being obtained by reacting an adduct [A] of a polymer of a conjugated diene having a number average molecular weight of 300 to 20,000 or a copolymer of the conjugated diene and a vinyl monomer with an α,β-unsaturated dicarboxylic acid or its anhydride, with a compound [B] of the formula:

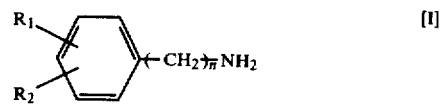

[I]

and a compound [C] of the formula:

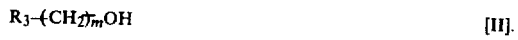

[II]

6 Claims, No Drawings

MODIFIED EPOXY RESIN COMPOSITION

The present invention relates to a modified epoxy resin composition and a process for modifying an epoxy resin for giving thereto other properties without deteriorating the original properties thereof.

Epoxy resins have usually excellent properties such as excellent mechanical strength, adhesion, heat resistance and chemical resistance, and hence, they are widely used for coating compositions, electrical insulators, materials for civil engineering and construction, adhesives, composite materials, or the like. On the other hand, the cured epoxy resin products are usually inferior in flexibility, and hence, it has been attempted to improve the fragility thereof and to give thereto excellent impact resistance and thermal shock resistance. For instance, it has been proposed to modify the epoxy resin by adding thereto a modifying agent such as polysulfide, polychloroprene, polybutadiene, dimeric acid, polyester ether, polyamide, etc., but such methods have some disadvantages that it rather results in deterioration of the original properties of epoxy resin such as mechanical strength, electric properties, heat resistance, solvent resistance, corrosion resistance, etc. and further that the most suitable method must be individually selected in accordance with the intended utilities. In case of employing the resin for coating composition, the epoxy resin should have impact resistance and adhesion to the substrate as well as solvent resistance, corrosion resistance, and further other properties such as compatibility of the epoxy resin with the modifying agent, homogeneity and film-forming properties of the vehicle resin, crosslinking curing properties, or the like. Such requirements have never been satisfied by the known techniques.

Recently, epoxy resins are used as a material for cathode electrocoating composition suitable for coating automobiles, and for such a purpose, there have been proposed various methods for improving the properties of the epoxy resins, in other to give a coating composition having excellent chipping resistance, corrosion resistance, etc. Among these, it is proposed to use as a flexibilizer a liquid polybutadiene which has been used for the preparation of anode electrocoasting compositions. However, the liquid polybutadiene has insufficient compatibility with the epoxy resin, and even if it is chemically bonded with the epoxy resin by means of an appropriate reactive group, it is still difficult to obtain an excellent composition which can give a clear uniform coating layer. In order to eliminate such a drawback, particularly to improve the compatibility of the flexibilizer with the epoxy resin, various methods have been proposed. For example, it is disclosed in Japanese Patent Publication (unexamined) No. 97632/1979 that a base resin for a cationic electrocoating composition is obtained by reacting a butadiene-acrylonitrile copolymer containing carboxyl groups at both terminal thereof with an epoxy resin. According to this method, the compatibility with the epoxy resin is fairly improved owing to the acrylonitrile group, but it is still insufficient in the film-forming properties and flexibility. Moreover, since this copolymer is a comparatively high molecular weight functional polymer, use thereof is restricted, for example, it is required to specify the ratio to the epoxy resin in order to give the desired homogeneity of the electrocoating composition or to regulate the concentration of a cationic group in order to give the desired electrophoresis. This method is also disadvantageous in view of the high cost.

Another approach for improving the flexibility by using a liquid polybutadiene is disclosed in Japanese Patent Publication (unexamined) No. 5933/1980, wherein a reaction product of an epoxy resin with a conjugated diene polymer containing a carboxyl group at the terminal or intermediate of the molecule is used as a base resin for a cationic electrocoating composition. The liquid polybutadiene used in this method is substantially a liquid polybutadiene having a high 1,2-vinyl structure and having carboxyl groups at both terminals, and the liquid polybutadiene is used for improving smoothness and curing properties of the coating film. These liquid polybutadienes having high 1,2-vinyl structure or consisting mainly of butadiene skeleton are still inferior in the compatibility with the epoxy resins.

Another method is proposed in Japanese Patent Publication (unexamined) No. 5932/1980. This literature discloses a resin composition suitable for a cathode precipitating type electrocoating with comprises predominantly a reaction product of a basic resin having a tertiary amino group and hydroxy group via an imido bond in the main chain and an amine-modified epoxy resin, wherein the basic resin is obtained by reacting an anhydrous maleic acid adduct of a liquid polybutadiene with a diamine containing a tertiary amino group within the molecule (e.g. N,N-dimethylaminopropanediamine) and/or an aminoalcohol (e.g. monoethanolamine), by which the liquid polybutadiene or natural drying oil is bonded with a tertiary amino group and hydroxy group via an imidohydrocarbon bond. Since the basic resin used in this method contains a large amount of an aliphatic tertiary amino group having a comparatively strong basicity and has a polymerization catalytic activity to the epoxy group, when the basic resin is reacted with the epoxy resin in a system containing an excess amount of epoxy groups, a polymerization reaction due to self ring-opening of the epoxy groups occurs at the stage of insufficiently proceeding the esterification reaction between the carboxyl group of the basic resin and the epoxy group of the epoxy resin, which unfavorably results in gelation of the system. Accordingly, in the method of Japanese Patent Publication (unexamined) No. 5932/1980, the amination of the epoxy resin is carried out while preventing the above-mentioned undesirable side reaction by means of carrying out the reaction in the presence of an equimolar amount of an amine to the excess expoxy groups.

Thus, it has been required to give a flexibility to the epoxy resins not only in the field of cationic electrocoating but also in other coating fields and in the production of various molding products.

Under the circumstances, the present inventors have intensively studied an improvement in a process for modifying epoxy resins in order to obtain an improved modified epoxy resin having excellent properties suitable for various requirements and various utilities. As a result, it has been found that the desired modified epoxy resin can be obtained by reacting or mixing an epoxy resin with a specific modified adduct of a conjugated diene polymer or copolymer.

An object of the present invention is to provide an improved modified epoxy resin which can give a cured product having excellent flexibility and has excellent compatibility with other epoxy resins. Another object of the invention is to provide an improved process for modifying epoxy resins in order to give them various excellent properties without deteriorating the original properties thereof. These and other objects as well as advantages of the present invention will be apparent to those skilled in the art from the following description.

The improved epoxy resin of the present invention is obtained by treating an epoxy resin with at least one modified adduct [D] of a conjugated diene polymer or copolymer which has an imido bond and/or amido bond and a semiester structure and has an acid value owing to a free carboxyl group of 5 to 100, preferably 10 to 50, said modified adduct being obtained by reacting an adduct [A] of a polymer of a conjugated diene having a number average molecular weight of 300 to 20,000, preferably 500 to 5,000, or a copolymer of the conjugated diene and a vinyl monomer with an α,β-unsaturated dicarboxylic acid or its anhydride, with a compound [B] of the formula:

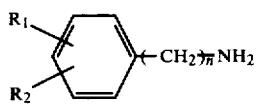

wherein $R_1$ and $R_2$ are the same or different and are each hydrogen, an alkyl having 1 to 5 carbon atoms, a halogen, cyano, hydroxy, thiol, methoxy, —$CONH_2$, —$COCH_3$, —$COOCH_3$, or —$N(CH_3)_2$, and n is an integer of 0 to 3, and a compound [C]

wherein $R_3$ is a saturated or unsaturated hydrocarbon group having 1 to 18 carbon atoms; a saturated or unsaturated hydrocarbon having 1 to 12 carbon atoms and containing cyano, a halogen, an ether bond, an ester bond or a hydroxy group which bonds to a secondary or tertiary carbon; a saturated alcohol residue having 1 to 8 carbon atoms; acrylic acid residue; or methacrylic acid residue; and m is an integer of from 0 to 3.

The modified epoxy resin of the present invention is characteristic in that it has good compatibility with the conventional epoxy resins, such as epi-bis type epoxy resins derived from bisphenol A and epichlorohydrin, polyglycidylether type epoxy resins derived from a novolac resin, polyglycidyl amine type epoxy resins derived from an aromatic amine, and polyglycidyl ester type epoxy resins derived from an aromatic polycarboxylic acid, and that when it is used for coating compositions, it can give cured products having excellent flexibility, such as excellent impact resistance and thermal shock resistance.

The present invention is also characteristic in that the most suitable micro structure or molecular weight of the conjugated diene polymer or copolymer can freely be selected in accordance with the requirements and utilities of the final products. For instance, when a liquid polybutadiene being rich in cis-1,4 bond is used as a base of the modified adduct, a comparatively small amount of the modified adduct can give the desired flexibility to the epoxy resin. When an adduct having a high 1,2-vinyl structure is used, there can be obtained a hard composition. Besides, by controlling an amount of the α,β-unsaturated dicarboxylic acid or its anhydride (e.g. maleic anhydride) introduced into the liquid polybutadiene or by controlling the modifying conditions, the dicarboxylic acid or its anhydride can react with the liquid polybutadiene in an amount equimolar or nearly equimolar to the epoxy resin (as calculated as a monomer).

The conjugated diene polymer used in the present invention has a number average molecular weight of 300 to 20,000, preferably 500 to 5,000. The conjugated diene polymer includes a homopolymer of a conjugated diene monomer and also a copolymer thereof with other copolymerizable monomers. The micro structure of the double bond thereof is not matter, but the polymer may contain an optional ratio of 1,4-bond, 1,2-bond or 3,4-bond.

Suitable examples of the conjugated diene monomer are butadiene, isoprene, chloroprene, 1,3-pentadiene, or the like. Suitable examples of other copolymerizable monomers are vinyl monomers such as acrylic acid esters (e.g. methyl acrylate, ethyl acrylate, etc.), methacrylic acid esters (e.g. methyl methacrylate, ethyl methacrylate, etc.), acrylonitrile, styrene, acetylene, ethylene, propylene, or the like, which may be used alone or in combination of two or more thereof. The conjugated diene copolymer contains preferably 50% by mole or more of the conjugated diene monomer, preferably butadiene or isoprene. The conjugated diene polymer and copolymer may also contain carboxyl and/or hydroxy groups.

The α,β-unsaturated dicarboxylic acid or its anhydride includes maleic anhydride, maleic acid, fumaric acid, itaconic acid, citraconic acid, or the like, among which maleic anhydride is particularly suitable. In accordance with variations of the micro structure and molecular weights of the conjugated diene polymer or copolymer, the kinds of the copolymerizable monomers and also the desired utilities of the final products, the most suitable amount of the α,β-unsaturated dicarboxylic acid or its anhydride and also the most suitable kind and amount of the compounds [B] and [C] are carefully selected.

The compound [B] of the formula [I] contains a primary amino group and an aromatic group in the molecule.

Suitable examples of the compound [B] of the formula [I] are aniline, toluidine, xylidine, aminophenol, aminocresol, aminoresorcinol, ethylaniline, cumidine, p-tert-butylaniline, p-tert-amylaniline, benzylamine, phenethylamine, anisidine, aminophenetol, vinylaniline, chloroaniline, dichloroaniline, aminothiophenol, aminobenzonitrile, aminobenzamide, aminoacetophenone, methyl aminobenzoate, aminoethylphenol, N,N-dimethylphenylenediamine, or the like, but are not limited thereto.

The compound [C] of the formula [II] contains a hydroxy group in the molecule.

Suitable examples of the compound [C] of the formula [II] are saturated alcohols having 1 to 18 carbon atoms such as methanol, ethanol, n-propanol, isopropanol, n-butanol, isobutanol, sec-butanol, tert-butanol, n-amyl alcohol, activated amyl alcohol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-dodecanol, trimethylnonyl alcohol, tetradecanol, heptadecanol, or octadecanol; unsaturated alcohols having 2 to 18 carbon atoms such as allyl alcohol, crotyl alcohol, 3-buten-2-ol, propargyl alcohol, or oleyl alcohol; benzyl alcohol, phenethyl alcohol, cinnamyl alcohol, benzyloxyethanol, and their nucleus-substituted derivatives; halogenated alcohols such as ethylene chlorohydrin; ethylene cyanohydrin, furfuryl alcohol, tetrahydrofurfuryl alcohol; glycol monoalkyl ethers such as ethylene glycol monoalkyl ethers (e.g. ethylene glycol monomethyl ether, ethylene glycol monoethyl ether, ethylene glycol monopropyl ether, ethylene glycol monobutyl ether), diethylene glycol monoalkyl ethers, triethylene glycol monoalkyl ethers which have 1 to 8 carbon atoms in the alkyl moiety; ethylene oxide adducts such as phenol ethylene oxide adduct, an alkylphenol ethylene oxide adduct, an aliphatic or aromatic monocarboxylic acid ethylene oxide adduct; hydroxyalkyl acrylates or methacrylates such as 2-hydroxyethyl methacrylate, 2-hydroxyethyl acrylate, 3-hydroxypropyl methacrylate, 3-hydroxypropyl acrylate; and further glycidol, cyclohexanol, glycerin dichlorohydrin, glycerin di-aliphatic carboxylate, abiethinol, propylene glycol, or the like. These compounds may be used alone or in combination of two or more thereof.

The amount of $\alpha,\beta$-unsaturated dicarboxylic acid or its anhydride may vary depending on the molecular weight of the conjugated diene polymer or copolymer to be reacted, but is usually in such a range that the content of the $\alpha,\beta$-unsaturated dicarboxylic acid or its anhydride in the adduct [A] becomes 5 to 50% by weight, preferably 5 to 30% by weight. When the content of $\alpha,\beta$-dicarboxylic acid or its anhydride in the adduct [A] is lower than 5% by weight, the obtained modified epoxy resin shows inferior compatibility with other epoxy resins, and on the other hand, when the content is over 50% by weight, the modification process can hardly be carried out because of the increased viscosity of the reaction system.

The adduct [A] of the conjugated diene polymer or copolymer with the $\alpha,\beta$-dicarboxylic acid or its anhydride can be prepared by any conventional method, for example, by mixing a conjugated diene polymer or copolymer and an $\alpha,\beta$-dicarboxylic acid or its anhydride (e.g. maleic anhydride) and reacting them under an inert gas at a temperature of 50° to 300° C., preferably 150° to 210° C., for 30 minutes to 10 hours, preferably 2 to 6 hours. In this reaction, an antigelling agent may optionally be added in an amount of 0.01 to 5% by weight, and further an inert organic solvent may be used.

The modified adduct [D] can be prepared by reacting the adduct [A] with an amino compound [B] of the formula [I] or [II] and a compound [C] containing a hydroxy group, wherein the compound [B] and the compound [C] are used in an amount of 5 to 95% by mole and 95 to 5% by mole, respectively, to 1 mole of the $\alpha,\beta$-dicarboxylic acid or its anhydride (e.g. maleic anhydride) bonded to the conjugated diene polymer or copolymer. In this reaction, the compound [B] is reacted with the acid or its anhydride group contained in the adduct [A] and is almost derived into imido bond, but it may optionally be derived into an amido bond—carboxylic acid skeleton. Besides, the compound [C] is derived into an ester bond—carboxylic acid skeleton.

The modified adduct [D] contains preferably at least 0.5 equivalent weight, preferably 0.75 equivalent weight or more, of a free carboxyl group (as calculated as —COOH number) per one molecule of the conjugated diene polymer or copolymer (as calculated based on the average molecular weight). In this respect, the suitable amounts of the compound [B] and compound [C] are also determined.

The reaction of the adduct [A] with the compounds [B] and [C] may be carried out simultaneously in the same reaction system or in sequence, that is, by reacting firstly the adduct [A] with the compound [B] or [C] (preferably compound [C]) and adding the compound [C] or [B] (preferably compound [B]) to the reaction system preferably after partially proceeding the above reaction, and then completing the reaction of the adduct [A] and the compounds [B] and [C]. Thus, the reaction of the adduct [A] with the compounds [B] and [C] includes the following features.

(1) The adduct [A] is mixed with the compound [B] and the compound [C] and the mixture is simultaneously subjected to the reaction.

(2) The adduct [A] is firstly, preferably partially, reacted with the compound [C], and subsequently the compound [B] is reacted with the resulting reaction mixture.

(3) The adduct [A] is reacted with the compounds [B] and [C] while adding dropwise a mixture of the compounds [B] and [C] to the reaction system.

(4) The adduct [A] is firstly, preferably partially, reacted with the compound [B], and subsequently the compound [C] is reacted with the resulting reaction mixture.

When the adduct [A] is firstly reacted with an equimolar or excess amound of the compound [C], whole or most acid anhydride groups contained in the adduct [A] are ring-opened to give a partially esterified product, and then, the extra partial ester bonds may be converted into imido bonds by reacting the product with the compound [B] of a predetermined amount. In this case, the suitable amount of the compound [B] is determined so that the ratio of the substituents in the final product becomes in the suitable range.

By the reaction of the adduct [A] and the compound [C], there is obtained a partially esterified product. This reaction can be carried out by any conventional method, for example, by reacting the adduct [A] with the compound [C] at a temperature of 30° to 200° C., preferably 30° to 160° C., for 30 minutes to 5 hours, usually in the presence of a slight amount of a catalyst selected from quaternary ammonium salts, tertiary amines, alkali metal salts, or organic acids, wherein an inert solvent such as toluene, xylene, methyl isobutyl ketone or ethylene glycol ethyl ether monoacetate may optionally be used.

The reaction of the adduct [A] and the compound [B] is also carried out by any conventional method, for example, by reacting the adduct [A] or the partial reaction product of the adduct [A] and the compound [C] with the compound [B] at a temperature of 30° to 250° C., preferably 30° to 200° C., with taking out the by-produced water. Since this reaction is occasionally accompanied with exotherm or foaming, the compound [B] is dividedly added to the reaction system, or an appropriate inert solvent as mentioned above is used. In order to obtain partially amidated products, it is preferable to carry out the reaction at a temperature not higher than 100° C.

The finishing point of the above-mentioned reactions may be determined by gas chromatography, IR spectrum, or based upon the amount of the by-produced water, but it is usually easily determined by measuring an acid value, amine value or saponification value of the reaction system.

Modification of an epoxy resin with the modified adduct [D] thus obtained is carried out by mixing an epoxy resin containing at least one epoxy group, preferably two or more epoxy groups with the modified adduct [D] and reacting the mixture under an inert gas at a temperature of 50° to 250° C., preferably 80° to 200° C., for 30 minutes to 10 hours, wherein appropriate catalyst and solvent as mentioned above may optionally be used. The reaction is usually carried out while checking the acid value of the system in order to determine the finishing point.

The amount of the modified adduct [D] may vary with the requirements and utilities of the final modified epoxy resins, but is usually in the range of 5 to 300 parts by weight, preferably 5 to 100 parts by weight, more preferably 5 to 50 parts by weight, to 100 parts by weight of the epoxy resin.

The modified epoxy resin obtained by the present invention contains an epoxy group in the molecule, and hence, can be used like the conventional unmodified epoxy resins and can give a cured product having excellent flexibility and thermal shock resistance with keeping excellent mechanical strength, adhesion, heat resistance, and chemical resistance. Thus, the modified epoxy resin of the present invention can be derived to a resin for cationic electrocoating composition having excellent chipping resistance and corrosion resistance by aminating the remaining epoxy groups of the modified epoxy resin and also using isocyanate compounds. Besides, the modified epoxy resin of the present invention can be used for the preparation of various coating compositions by incorporating together with a suitable curing agent. Moreover, a liquid resin obtained by modifying an epoxy resin having a low molecular weight by the present invention is suitable as a cast resin having excellent thermal shock resistance.

The present invention is illustrated by the following Examples, but is not limited thereto.

EXAMPLE 1

A liquid polybutadiene (number average molecular weight: 1680, viscosity at 20° C.: 650 cp, iodine value (Wijs method): 445, cis-1,4 structure: 76%, trans-1,4 structure: 23%, and 1,2-vinyl structure: 1%) (340 g), maleic anhydride (60 g) and iron naphthenate (Fe: 5.0%) (0.68 g) are charged into a 500 ml four-necked flask, and the mixture is reacted under nitrogen gas at 190° C. for 4 hours to give a maleinated polybutadiene (total acid value: 162).

Into a 500 ml four-necked flask are charged the maleinated polybutadiene obtained above (200 g), toluene (54.0 g), 2-hydroxyethyl methacrylate (13.0 g), phenothiazine (0.8 g) and benzyltrimethylammonium chloride (30 mg), and the mixture is reacted at 90° C. for 2 hours. The flask is equipped with a condenser for taking out the by-produced water and a dropping funnel, and thereto is added dropwise a mixture of aniline (18.6 g), phenothiazine (0.5 g) and toluene (44 g) through the dropping funnel. The mixture is reacted with reflux while taking out almost the by-produced water and further the reaction is continued with raising gradually the temperature while distilling off toluene from the system, by which there is obtained a viscous modified adduct (acid value: 23.0, total amine value: 0, remaining toluene: 3% by weight).

The reaction product thus obtained (30 g), a epi-bis type epoxy resin derived from bisphenol A and epichlorohydrin (epoxy equivalent weight: 488) (170 g), ethylene glycol ethyl ether monoacetate (hereinafter, referred to as "EGA") (25 g), phenothiazine (0.25 g) and benzyltrimethylammonium chloride (10 mg) are reacted under nitrogen gas at 150° C. for 3 hours, by which the acid value of the reaction system becomes zero (0). The liquid modified epoxy resin has an epoxy equivalent weight of 760 (coverted as solid component) (calculated from the remaining epoxy groups thereof).

The modified epoxy resin thus obtained was subjected to the following tests.

The liquid modified epoxy resin (10 g) was mixed well with diaminodiphenylmethane (0.35 g), and the mixture was coated onto a soft steel panel and was cured at 180° C. for 20 minutes to give a cured film having excellent clarity and gloss. From the excellent clarity of the cured film, it was confirmed that the polybutadiene component had sufficient compatibility with the epoxy resin.

Besides, a cured film sample (thickness: 30μ) prepared in the same manner as above showed a pencil hardness of H. When the surface of the sample was crosscut in checkerboard-like lines in squares of 1 mm × 1 mm and then the sample was bent by winding it around a column having a diameter of 4 mm so that the cut surface came outside, no change of the surface was observed. Besides, when a cellophane tape was adhered on the cut surface of the sample and thereafter was peeled off, neither peeling of the film nor relief was observed, by which it was confirmed that the cured film had sufficient flexibility and adhesion.

For comparison purpose, unmodified epi-bis type epoxy resin (epoxy equivalent weight: 488) (10.0 g), diaminodiphenylmethane (1.04 g) and EGA (2.5 g) were mixed well, and the mixture was coated onto a soft steel panel and cured likewise to give a colorless cured film having excellent gloss (thickness: 30μ). This cured film showed a pencil hardness of H, but when it was crosscut in checkerboard-like lines likewise, the cured film was partially broken and peeled off, and further, by subjecting the cut surface to the bending test and to peeling off test with a cellophane tape, the cured film was wholly peeled off.

EXAMPLE 2

A liquid polybutadiene (number average molecular weight: 600, viscosity at 30° C.: 50 cp, iodine value: 450, cis-1,4 structure: 31%, trans-1,4 structure: 64%, and 1,2-vinyl structure: 5%) (300 g), phenyl-α-naphthylamine (80 mg) and maleic anhydride (100 g) are charged into a 500 ml four-necked flask, and the mixture is reacted under nitrogen gas at 190° C. for 4 hours to give a maleinated polybutadiene (total acid value: 270).

Into a 500 ml four-necked flask are charged the maleinated polybutadiene obtained above (200 g), 2,6-di-tert-butyl-4methylphenol (hereafter, referred to as "BHT") (1.0 g), allyl alcohol (10.9 g) and benzyldimethylamine (0.1 g), and the mixture is reacted at 90° C. for 2 hours, and thereto is added dropwise aniline (30.0 g) through a dropping funnel. The mixture is reacted at 160° C. for 3 hours while taking out the by-produced water, by which there is obtained a viscous modified adduct (total amine value: 0, acid value: 44.8, viscosity at 60° C.: 4,610 cp). It is confirmed that the acid anhydride groups in the maleinated polybutadiene are converted into semi-ester groups and imido groups by the above analytical data and IR spectrum.

The modified adduct thus obtained (40 g) and an epi-bis type epoxy resin (epoxy equivalent weight: 488) (60 g) are reacted under nitrogen gas at 150° C. for 3 hours to give a homogeneous modified epoxy resin being rich in clarity (acid value: 0, epoxy equivalent weight: 1095).

The modified epoxy resin thus obtained was subjected to the following tests.

The modified epoxy resin (10 g), diaminodiphenylmethane (0.46 g) and EGA (30 g) were mixed well and the resulting solution was coated onto a soft steel panel and cured at 180° C. for 20 minutes to give a homogeneous clear cured film (pencil hardness: H)

A cured coating film (thickness: 30μ) was prepared likewise and crosscut in the same manner as described in Example 1, followed by subjecting to the bending test and peeling test of a cellophane tape likewise. As a result, no change of the coating surface and hence, it was confirmed that the coating film showed excellent flexibility and adhesion.

EXAMPLE 3

The same liquid polybutadiene as used in Example 1 (320 g), maleic anhydride (80 g) and iron naphthenate (Fe: 5.0%) (0.7 g) are reacted in the same manner as described in Example 1 to give maleinated polybutadiene (total acid value: 220).

The maleinated polybutadiene obtained above (200 g), allyl alcohol (6.0 g), BHT (1.0 g), toluene (79 g), benzyltrimethylammonium chloride (15 mg) and aniline (27.0 g) are reacted in the same manner as described in Example 1, by which the maleinated polybutadiene is semi-esterified with allyl alcohol and then imidated with aniline, during which the by-produced water and toluene are distilled off. As a result, there is obtained a modified adduct (acid value: 24.9, total amine value: 0, remaining toluene: 3.5% by weight, apparent viscosity of 60% solution: 680 P).

The modified adduct thus obtained (150 g), an epi-bis type epoxy resin (epoxy equivalent weight: 488) (350 g), EGA (167 g) and benzyltrimethylammonium chloride (67 mg) are reacted under nitrogen gas at 150° C. for 3 hours, by which the acid value of the reaction system become almost zero (0).

The modified epoxy resin thus obtained was subjected to the following tests.

The liquid modified epoxy resin (10 g) was mixed well with diaminodiphenylmethane (0.49 g), and the mixture was coated onto a tinplate and was cured at 180° C. for 20 minutes to give a cured film having excellent clarity and gloss.

In the same manner as described in Example 1, the surface of the film was crosscut in checkerboard-like lines in squares of 1 mm × 1 mm and then the film was bent by winding it around a column having a diameter of 4 mm so that the cut surface came outside, and further, a cellophane tape was adhered on the cut surface of the film and thereafter was peeled off. As a result, neither peeling of the film, nor relief, nor change of film was observed.

To the epoxy resin containing amino group obtained above is added dropwise a 70% solution (118 g) of 2-ethylhexanol-semiblocked tolylene diisocyanate (2,4-bond/2,6-bond: 80/20%) in EGA, and the mixture is reacted at 100° C. for 2 hours to give a urethane-crosslinked type resin. To the liquid resin thus obtained (350 g) is added dibutyl tin laurate (1.4 g), and the mixture is neutralized with acetic acid (7.0 g) with stirring, and thereto is gradually added a deionized water (1320 g) to give a homogeneous electrocoating composition (pH 6.1).

The electrocoating composition prepared above was subjected to electrocoating by using a dull steel plate (JIS G-3141, SPCE-SD) as a cathode and carbon plate as an anode at 30° C. with stirring at 100 V for 3 minutes. After the electrocoating, the coated steel plate was washed with water, and cured at 180° C. for 20 minutes to give a clear cured film having excellent gloss.

This cured film had a pencil hardness: 3H, Erichsen value (crosscut): no change above 8 mm, duPont impact: above 50 cm, by which it was confirmed that the product had sufficient flexibility and adhesion.

EXAMPLE 4

Into a 200 ml four-necked flask are charged a liquid polybutadiene (number average molecular weight: 2000, viscosity at 20° C.: 150 p, 1,2-vinyl structure: 65%, trans-1,4 structure: 14%, and cis-1,4 structure: 16%) (100 g), BHT (0.1 g), N-phenyl-N'-isopropyl-p-phenylenediamine (0.2 g), 1,4-dihydroxynaphthalene (50 mg), xylene (5.0 g) and maleic anhydride (20.5 g), and the mixture is reacted under nitrogen gas at 190° C. for 5 hours. After the reaction, the reaction mixture is diluted with toluene (25.3 g) to give a solution of a maleinated polybutadiene in toluene (solid component: 80% by weight).

The maleinated product (100 g), BHT (50 mg), butyl cellosolve (3.9 g) and N,N-dimethylbenzylamine (50 mg) are reacted under nitrogen gas at 125°–130° C. for one hour. After the reaction, the reaction mixture is cooled to 70° C., and thereto is added dropwise a mixture of aniline (9.8 g) and toluene (10 g), and the mixture is kept at the same temperature for one hour. With distilling off toluene and the by-produced water, the mixture is gradually heated to raise the temperature up to 170° C. to give a partially esterified-imidated product (about 92 g), which has an acid value of 21.0.

The modified product (40 g), epi-bis type epoxy resin (epoxy equivalent weight: 488) (60 g), EGA (42.8 g), BHT (0.1 g) and N,N-dimethylbenzylamine (30 mg) are reacted under nitrogen gas at 150° C. for 3 hours to give a modified epoxy resin solution (acid value: nearly equal zero, solid component (gram) per 1 epoxy equivalent weight: 932).

The modified resin solution thus obtained (30 g) was mixed with diaminodiphenylmethane (1.14 g), and the mixture was coated onto a soft steel panel and was cured at 180° C. for 30 minutes to give a clear homogeneous film (thickness: 70μ) having excellent gloss, wherein the modified product was well compatible with the epoxy resin. When it was subjected to a bending test by winding it around a column having a diameter of 4 mm, no change of the film was observed, by which it was confirmed that the product had an excellent flexibility.

EXAMPLE 5

In the same manner as described in Example 4, the maleinated polybutadiene obtained in Example 3 (80 g), toluene (20 g), ethylene glycol monobutyl ether (4.5 g) and N,N-dimethylbenzylamine (50 mg) are reacted, by which the polybutadiene is partially esterified, and thereto are added N,N-dimethyl-p-phenylenediamine (8.5 g) and further a mixture of aniline (5.8 g) and toluene (10 g). The mixture is reacted in the same manner as in Example 4 while distilling off low boiling point components from the system, by which the imidation proceeds. As a result, there is obtained a modified product (about 97 g) having an acid value: 22.0 and total amine value: 36.0.

The modified product thus obtained (90 g), epi-bis type epoxy resin (epoxy equivalent weight: 488) (135 g), EGA (75 g) and N,N-dimethylbenzylamine (67 mg) are reacted under nitrogen gas at 150° C. for 1.5 hour, by which the acid value of the reaction system becomes almost zero (0). This product has a solid component (gram) per 1 epoxy equivalent weight: 980, and when the mixture thereof is coated onto a soft steel panel and cured in the same manner as in Example 4 to give a clear cured film having excellent gloss.

The modified epoxy resin obtained above (270 g), diethanolamine (21.7 g) and EGA (28.6 g) are reacted under nitrogen gas at 80° C. for 3 hours, by which the epoxy groups are ring-opened. The same 70% solution of 2-ethylhexanol-semiblocked tolylene diisocyanate (80/20) in EGA as used in Example 3 (122.3g) is added thereto, and the mixture is reacted at 100° C. for 2 hours to give a urethane-crosslinked type resin having total amine value: 46.0 (converted into solid component).

To the resin (420 g) are added dibutyl tin laurate (1.4 g) and further glacial acetic acid (10 g) and deionized water (1597 g) to give a homogeneous electrocoating composition (pH 6.4).

In the same manner as described in Example 3, the composition was subjected to electrocoating to give a clear cured film (thickness: 20μ) having excellent gloss.

This cured film had a pencil hardness: 2H, Erichsen value (crosscut): no change above 8 mm, and peeling of cellophane tape: no. That is, the product showed excellent flexibility and adhesion.

Reference Example 1

Into a 200 ml four-necked flask are charged a liquid polybutadiene containing terminal COOH group (molecular weight: 1450, acid value: 56, 1,2-vinyl bond: 91%) (30 g), an epi-bis type epoxy resin (epoxy equivalent weight: 488) (70 g), EGA (34 g), BHT (0.5 g) and benzyltrimethylammonium chloride (15 mg), and the mixture is reacted under nitrogen gas at 150° C. for 3 hours to give a modified epoxy resin [acid value: almost 0, epoxy equivalent weight: 889 (converted as solid material)].

When the modified epoxy resin thus obtained was distilled under reduced pressure to remove the solvent, there was obtained a white opaque resin, by which it is assumed that the polybutadiene component of the resin is not sufficiently compatible with the epoxy resin. Besides, when the modified epoxy resin (10 g) was mixed with diaminophenylmethane (0.43 g), and the resulting mixture was coated onto a soft steel panel and cured at 180° C. for 20 minutes, there was obtained an opaque coating film (thickness: 20μ), from which the inferior compatibility was re-confirmed. Moreover, the surface of the coating film was somewhat shrunk, and when it was crosscut likewise, it showed blush and inferior adhesion by the peeling test of a cellophane tape.

Reference Example 2

The maleinated polybutadiene obtained in Example 3 (100 g), toluene (38 g), BHT (0.5 g) and aniline (19.0 g) are reacted under nitrogen gas by heating up till the final temperature of 160° C. while removing the by-produced water and toluene to give a reaction product having an acid value: 3.8 and a total amine: nearly equal zero, wherein almost the acid anhydride groups are converted into aniline-imido groups.

The modified adduct obtained above (30 g) and an epi-bis type epoxy resin (epoxy equivalent weight: 488) (70 g) are blended under nitrogen gas at 150° C. for 1 hour to give a blended product having less clarity, from which it is assumed that the polybutadiene component has inferior compatibility with the epoxy resin.

Besides, the modified adduct (10 g) is dissolved in EGA (4 g), and therein is dissolved diaminodiphenylmethane (0.72 g). The mixture is coated onto a soft steel panel and cured at 180° C. for 20 minutes to give a opaque cured film, which means that it has less compatibility.

Reference Example 3

The maleinated polybutadiene obtained in Example 1, i.e. 20% by weight maleinated product of a liquid polybutadiene (number average molecular weight: 1680, cis-1,4 structure: 76%) (80 g), toluene (20 g), ethylene glycol monobutyl ether (4.5 g), BHT (0.1 g) and N,N-dimethylbenzylamine (50 mg) are reacted under nitrogen gas at 130° C. for 1 hour to give a partially esterified product. The reaction mixture is heated to 70° C. and thereto are added gradually N,N-dimethylpropane diamine (12.7 g) and toluene (10 g) and the mixture is stirred at the same temperature for 1 hour. The mixture is heated until the final temperature becomes 170° C. while taking out toluene and by-produced water to give a modified product (acid value: 23.0, total amine value: 72.0) (about 96 g).

The partially esterified-imidated product thus obtained (40 g), an epi-bis type epoxy resin (epoxy equivalent weight: 488) (60 g), EGA (42.8 g) and BHT (0.1 g) are reacted under nitrogen gas at 150° C. for several tens minutes, at when the reaction mixture shows suddenly increased viscosity and finally gives an insoluble gel material. It is assumed that this phenomenon is due to ring-opening and polymerization of the large amounts of epoxy groups which is catalyzed by the aliphatic tertiary amine having strong basicity bonded to the polybutadiene chain via imido bond, with proceeding of the reaction between carboxyl groups and epoxy groups.

From this reference example, it is clear that such diamine which remains a comparatively strong basic aliphatic amine nitrogen in the molecule can not be used as an imidating agent for the modifying process of the present invention wherein a part of the epoxy groups in epoxy resin is modified and the remaining almost epoxy groups are remained in the free form for using them the subsequent reactions.

What is claimed is:

1. A modified epoxy resin composition, which comprises an epoxy resin and a modified adduct [D] of a conjugated diene polymer or copolymer which has an imido bond and/or amido bond and a semi-ester structure and has an acid value owing to a free carboxyl group of 5 to 100, said modified adduct being obtained by reacting an adduct [A] of a polymer of a conjugated diene having a number average molecular weight of 300 to 20,000 or a copolymer of the conjugated diene and vinyl monomer with an α,β-unsaturated dicarboxylic acid or its anhydride, with a compound [B] of the formula:

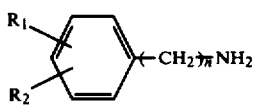

[I]

wherein $R_1$ and $R_2$ are the same or different and are each hydrogen, an alkyl having 1 to 5 carbon atoms, a halogen, cyano, hydroxy, thiol, methoxy, —$CONH_2$, —$COCH_3$, —$COOCH_3$, or —$N(CH_3)_2$, and n is an integer of 0 to 3, and a compound [C] of the formula:

[II]

wherein $R_3$ is a saturated or unsaturated hydrocarbon group having 1 to 18 carbon atoms; a saturated or unsaturated hydrocarbon having 1 to 12 carbon atoms and containing cyano, a halogen, an ether bond, an ester bond or a hydroxy group which bonds to a secondary or tertiary carbon; a saturated alcohol residue having 1 to 8 carbon atoms; acrylic acid residue; and m is an integer of from 0 to 3.

2. A modified epoxy resin composition according to claim 1, wherein the conjugated diene monomer is a member selected from the group consisting of butadiene, isoprene, chloroprene, and 1,3-pentadiene, and the vinyl monomer is a member selected from the group consisting of an acrylic acid ester, a methacrylic acid ester, acrylonitrile, styrene, acetylene, ethylene, and propylene.

3. A modified epoxy resin composition according to claim 1, wherein the α,β-unsaturated dicarboxylic acid is a member selected from the group consisting of maleic anhydride, maleic acid, fumaric acid, itaconic acid, and citraconic acid.

4. A modified epoxy resin composition according to claim 1, wherein the epoxy resin contains at least one epoxy group.

5. A modified epoxy resin composition according to claim 1, wherein the modified adduct [D] is used in an amount of 5 to 300 parts by weight to 100 parts by weight of the epoxy resin.

6. A process for producing a modified epoxy resin composition which comprises reacting or mixing an epoxy resin with at least one modified adduct [D] of a conjugated diene polymer or copolymer which has an imido bond and/or amido bond and a semi-ester structure has and an acid value owing to a free carboxyl group of 5 to 100, said modified adduct being obtained by reacting an adduct [A] of a polymer of a conjugated diene having a number average molecular weight of 300 to 20,000 or a copolymer of the conjugated diene and a vinyl monomer with an α,β-unsaturated dicarboxylic acid or its anhydride, with a compound [B] of the formula:

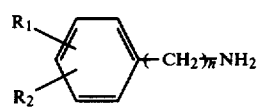

[I]

wherein $R_1$ and $R_2$ are the same or different and are each hydrogen, an alkyl having 1 to 5 carbon atoms, a halogen, cyano, hydroxy, thiol, methoxy, —$CONH_2$, —$COCH_3$, —$COOCH_3$, or —$N(CH_3)_2$, and n is an integer of 0 to 3, and a compound [C] of the formula:

[II]

wherein $R_3$ is a saturated or unsaturated hydrocarbon group having 1 to 18 carbon atoms; a saturated or unsaturated hydrocarbon having 1 to 12 carbon atoms and containing cyano, a halogen, an ether bond, an ester bond or a hydroxy group which bonds to a secondary or tertiary carbon; a saturated alcohol residue having 1 to 8 carbon atoms; acrylic acid residue; and m is an integer of from 0 to 3.

* * * * *